(12) United States Patent
Dupuis et al.

(10) Patent No.: US 11,179,850 B2
(45) Date of Patent: Nov. 23, 2021

(54) ROBOT MOTION PLANNING

(71) Applicant: Intrinsic Innovation LLC, Mountain View, CA (US)

(72) Inventors: Jean-Francois Dupuis, San Francisco, CA (US); Keegan Go, Mountain View, CA (US); Maryam Bandari, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 170 days.

(21) Appl. No.: 16/393,165

(22) Filed: Apr. 24, 2019

(65) Prior Publication Data

US 2020/0338733 A1 Oct. 29, 2020

(51) Int. Cl.
*B25J 9/16* (2006.01)

(52) U.S. Cl.
CPC .................... *B25J 9/1666* (2013.01)

(58) Field of Classification Search
CPC ........ B25J 9/1666; G05B 2219/40477; G05B 2219/40476; G05B 2219/39091
See application file for complete search history.

(56) References Cited

U.S. PATENT DOCUMENTS

| | | |
|---|---|---|
| 6,243,622 B1 | 6/2001 | Yim et al. |
| 2015/0251315 A1* | 9/2015 | Brandenberger .. G01N 35/0099 700/255 |
| 2017/0241790 A1* | 8/2017 | Yoshikawa ........ G01C 21/3446 |
| 2018/0001472 A1* | 1/2018 | Konidaris .............. B25J 9/1666 |
| 2019/0240835 A1* | 8/2019 | Sorin ...................... B25J 9/1671 |
| 2020/0215695 A1* | 7/2020 | Cristache ............... G06N 20/00 |

FOREIGN PATENT DOCUMENTS

| | | |
|---|---|---|
| CN | 108801255 | 11/2018 |
| DE | 102012206952 | 10/2013 |
| WO | WO2014081699 | 5/2014 |

OTHER PUBLICATIONS

Sean Quinlan and Oussama Khatib, "Elastic Bands: Connecting Path Planning and Control", 1993 (Year: 1993).*

(Continued)

*Primary Examiner* — Khoi H Tran
*Assistant Examiner* — Tristan J Greiner
(74) *Attorney, Agent, or Firm* — Fish & Richardson P.C.

(57) ABSTRACT

Methods, systems, and apparatus, including computer programs encoded on computer storage media, for planning a path of motion for a robot. In some implementations, a candidate path of movement is determined for each of multiple robots. A swept region, for each of the multiple robots, is determined that the robot would traverse through along its candidate path. At least some of the swept regions for the multiple robots is aggregated to determine amounts of overlap among the swept regions at different locations. Force vectors directed outward from the swept regions are assigned, wherein the force vectors have different magnitudes assigned according to the respective amounts of overlap of the swept regions at the different locations. A path for a particular robot to travel is determined based on the swept regions and the assigned magnitudes of the forces.

19 Claims, 5 Drawing Sheets

(56) References Cited

OTHER PUBLICATIONS

Lu Tin, Yixin Yin, Cheng-Jian Lin, "A New Potential Field Method for Mobile Robot Path Planning in the Dynamic Environments", 2009, Asian Journal of Control, vol. 11, No. 2. pp. 213-225 (Year: 2009).*

Jen-Hui Chuang and Narendra Ahuja, "An Analytically Tractable Potential Field Model of Free Space and Its Application in Obstacle Avoidance" 1998, IEEE Transactions on Systems, Man, and Cybernetics—Part B. Cybernetics, vol. 28. No 5. (Year: 1998).*

Rahul Kala, "On Repelling Robotic Trajectories: Coordination in Navigation of Multiple Mobile Robots" 2017 (Year: 2017).*

Quinlan et al, "Elastic Bands: Connecting Path Planning and Control," IEEE Xplore, Aug. 2002, 6 pages.

Kala et al., "On repelling robotic trajectories coordination in navigation of multiple mobile robots," Intel Serv Robotics, Aug. 2017, 11(1):79-95.

PCT International Search Report and Written Opinion in International Appln. No. PCT/US2020/029600, dated Aug. 3, 2020, 6 pages.

\* cited by examiner

ROBOT MOTION PLANNING

BACKGROUND

This specification relates generally to robot motion planning.

Robotic systems are used in many settings, including manufacturing plants, hospitals, and retail stores. To accomplish a task, robots often need to move from place to place. Robots and associated systems often need to be able to plan a route for a robot to move in order to accomplish a task.

SUMMARY

In some implementations, a system can use a path planning technique to determine a planned path of motion for a robot, for example, a path that avoids obstacles (e.g., stationary and dynamic) found along the path. The system can use an elastic path planning technique to shape candidate paths to account for obstacles, as discussed further below. The system can take into account the planned or proposed paths of motion of other robots, in order to plan a path that avoids or limits conflict with the paths of the other robots. For example, when planning the path of a first robot, the system can determine a swept region for a planned path of motion for a second robot. The swept region may represent, for example, the total area or total volume that the second robot would occupy at any point in time while the second robot moves along its planned path. If additional robots will move through the vicinity, the system can determine swept regions for each of their paths, and aggregate the swept regions for multiple robots. With this information, the system can generate or adjust a path for the first robot based on differing levels of traffic indicated by the aggregated swept region information for the other robots acting nearby. For example, using the elastic path planning technique, high-traffic regions where multiple robot paths overlap can be represented by force vectors that strongly direct the first robot's path away. Also, lower-traffic regions where at least one robot is planned to move can be represented with force vectors that influence the first robot's path to a lesser extent. In this manner, the elastic path planning process can plan paths that avoid high-traffic regions and low-traffic regions by maneuvering around the force vectors based on their respective strengths.

In general, elastic path planning can be used to improve a candidate path of movement that extends from a starting point to a destination. To determine the planned path, the system can first identify the obstacles that constrain movement. Force vectors can then be associated with each of the identified obstacles. The force vectors, which can be attractive or repulsive, can be determined based on characteristics associated with the obstacle or object, such as its dimensions, cautionary distances to other obstacles, and other parameters for the obstacle. As the system applies the generated force vectors to a path, the system can bend the path in an elastic manner, for example, stretching or deforming the path according to the magnitude and direction of the force vectors. As the force vectors represent the constraints presented by stationary and movable obstacles, bending the path based on these vectors can avoid these obstacles. The system can modify the planned path based on the various magnitudes and dispersion of the force vectors applied by the obstacles.

In some implementations, the system determines that the planned path is sufficiently optimized once the system determines that the path has met a set of predetermined criteria. The set of predetermined criteria can include compliance with rules for responding to the force vectors, while ensuring the system moves between a starting destination and an ending destination based on the initial path. Additionally, the set of predetermined criteria can include, for example, a requirement to maintain at least a minimum distance between the robot and obstacles to avoid collisions. Other criteria, such as user-defined criteria, may be used.

In some implementations, the system can generate multiple potential paths of motion for a robot using the elastic path planning technique. The system can select from the different paths based on determining that one or more of the paths has met the predetermined set of criteria. This technique can result in a selected path that ensures the robot avoids obstacles at a safe distance while successfully reaching the destination of the original path. The system may perform the path adjustment process iteratively, for example, to account for the way that a changed path of one robot may then create the need to change the path for another robot operating in the same region.

In some implementations, the system can consider predicted or planned motions of other robots in an environment during path planning. The planned motions of the other robots may interfere with or influence the path being planned for a robot. The system can generate force vectors based on predicted or planned motions of the other robots, thus treating the paths of other robots as obstacles to be avoided. The system can determine the magnitude and direction of the force vectors based on the swept area or swept volumes representing the summation of regions that the robots would pass through along their respective paths. Using the force vectors, the system can determine a path that avoids the regions where future motions of the other robots will occur. Using a path planned in this manner, the robot can move along the planned path without interfering with the other robots.

In some implementations, the system can apply a summation of force vectors during path planning to account for multiple obstacles. The system can sum the force vectors that act on the same spatial region to generate resultant force vectors. The system can use the resultant force vectors to determine the planned path in order to account for forces applied by multiple obstacles.

The path planning process can take into account the characteristics of various obstacles (e.g., dynamic and static obstacles) during path planning. The robot can first analyze the environment, determine the locations of objects that may represent potential obstacles, and/or determine predicted movement of objects that represent potential dynamic obstacles. The robot can provide the obstacle information and the path information to a server system. The server system can plan a path for the robot to reach its destination, such as by elastically shaping an initial path based on force vectors calculated based on the characteristics of the obstacles. For example, the path can be stretched based on a combination of force vectors from multiple stationary and/or movable objects. In this process, the server system can also determine swept regions representing regions of future movement of other robots that may interfere with the desired path. Based on the swept regions, the server system can determine force vectors that shape the path of the robot.

The path planning process can be used to determine a path representing movement of the entire robot, e.g., robot locomotion to a destination. Alternatively, the path that is planned may specify movement of only a part of a robot, such as a translation and/or rotation of a portion of the robot, such as an arm or tool. The server system can provide the data representing the final path to the robot so that the robot can travel along the path, which allows the robot to avoid obstacles and reach the destination.

As noted above, the path planning process can take into account future motion of a robot using a swept volume representing the sum or all points that the robot is expected to pass through over a period of time. The swept region can be determined based on the characteristics of the robot, such as the width, size, and potential reach of the robot. The swept region can also incorporate information about the shape of the robot as it travels. For example, the robot may change its configuration or pose (e.g., by picking up a tool, raising or lowering an arm, etc.), and the swept region can be calculated on the shape or profile of the robot with those different configurations. As another example, the swept region may indicate the total profile representing the full range of motion of the robot, representing all possible extremities that the robot may reach in any configuration.

The system can aggregate the swept regions corresponding to each of multiple robots and identify regions with different degrees of overlap among the swept regions. The system can generate force vectors directed away from the swept regions, with the magnitudes of the force vectors being larger for areas of increased overlap. For example, force vectors with a first magnitude may radiate from regions where one swept region is located; force vectors with a second, higher magnitude may radiate from regions where two swept regions overlap; force vectors with a third, even higher magnitude may radiate from regions where three swept regions overlap; and so on. In some implementations, the magnitudes may be different from simply additive summing of force vectors for individual swept regions. For example, for areas of overlap of one, two, and three swept regions, the magnitudes of the respective force vectors may be 1:4:9 to more strongly push away from congested areas, instead of simply a ratio of 1:2:3 for linear or additive summing of individual force vectors. The magnitudes may be assigned to areas of different levels of overlap according to any appropriate mapping, assignment, or function. Based on the calculated force vectors radiating from the different overlapping regions, the system can plan a path by stretching a path segment in response to the magnitudes and directions of the force vectors corresponding to the overlapped regions.

The system can be used to plan paths in two dimensions, for example, movement of a robot along the ground. In this case, the swept regions may represent two-dimensional areas, which may represent a 2D profile of a robot or other moving object being swept along its planned or predicted path in a 2D space. The system can also be used to plan paths in three dimensions, in which case the swept regions may represent swept volumes determined to represent sweeping a 3D shape or profile of the robot through a 3D space. For example, in addition to planning movement along the ground, the system can plan paths that direct changes in a robot's pose, configuration, or orientation along the robot's vertical height as it travels along the planned path. With 3D planning, the force vectors may have at least a component that directs force up or down away from a region in 3D space. As a result, during planning, the 3D force vectors may direct the path of a robot under or over an obstacle at a particular height. The planned path can instruct a robot to adjust its configuration to create clearance above or below the obstacle. For example, the planned path may include, in addition to a direction for the robot to move along the floor, directions for the robot to raise or lower a robotic arm at different points along the path or to make other articulations or configuration changes in order to avoid obstacles.

In one general aspect, a method includes: determining a candidate path of movement for each of multiple robots; determining, for each of the multiple robots, a swept region that the robot would traverse through along its candidate path; aggregating at least some of the swept regions for the multiple robots to determine amounts of overlap among the swept regions at different locations; assigning force vectors directed outward from the swept regions, wherein the force vectors have different magnitudes assigned according to the respective amounts of overlap of the swept regions at the different locations; and determining a path for a particular robot to travel based on the swept regions and the assigned magnitudes of the forces.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes aggregating the swept regions for the multiple robots includes determining a different aggregation of the swept regions for each of the multiple robots, including the aggregation for each robot is an aggregation of the swept regions of each of the other robots. Assigning force vectors directed outward from the swept regions include assigning a different set of force vectors for each of the multiple robots, the set of force vectors for each robot being determined based on the aggregation of the swept regions of each of the other robots.

In some implementations, the method includes aggregating at least some of the swept regions includes aggregating the swept regions for all of the multiple robots except the particular robot to identify spatial regions having different levels of overlap of the swept regions for all of the multiple robots except the particular robot. Assigning force vectors includes assigning a set of force vectors representing forces outward from the spatial regions, where the force vectors in the set have magnitudes set according to the different levels of overlap of the swept regions for all of the multiple robots except the particular robot. Determining the path for the particular robot comprises altering the candidate path by according to the set of force vectors.

In some implementations, the method further includes updating the candidate paths for each of the multiple robots based on aggregations of the swept regions; determining updated swept regions for the multiple robots based on the updated candidate paths; aggregating the updated swept regions and assigning updated force vectors directed outwards from the updated swept regions; determining an updated path for the particular robot to travel based on the updated swept regions and the updated force vectors.

In some implementations, the further includes determining a start location and a destination location for the particular robot; defining a path segment between the start location and the destination location; determining objects found within proximity to the path segment; generating force vectors corresponding to the objects based on characteristics of the objects. Determining a path for the particular robot to travel includes altering the path segment based on the force vectors corresponding to the objects and the force vectors directed outward from the swept regions. The method further includes a degree of alteration of the path segment is dependent on a measure of elasticity set for the path segment, the measure of elasticity defining a degree to which the path segment is stretched in response to the force vectors.

In some implementations, the method includes determining a region occupied by a stationary object; and assigning force vectors directed outward from the region occupied by the stationary object. The method includes the path for the particular robot to travel is further based on the force vectors directed outward from the region occupied by the stationary object.

In some implementations, the method includes determining a swept region for a path of movement of a non-robot object. The method includes aggregating at least some of the swept regions comprises aggregating at least some of the swept regions for the multiple robots with the swept region for the non-robot object.

In some implementations, determining the path for the particular robot to travel includes determining, based on the force vectors, an adjustment to a pose or shape of the particular robot to be carried out by the particular robot as the particular robot travels the determined path.

In some implementations, the force vectors are two-dimensional, and the swept region is a two-dimensional area.

In some implementations, the force vectors are three-dimensional, and the swept region is a three-dimensional volume.

In some implementations, determining the path for the particular robot to travel based on the swept regions and the assigned magnitudes of the forces further includes: constraining a portion of the path for the particular robot based on characteristics of the particular robot. The characteristics of the particular robot include a speed limit of the particular robot, a size of the particular robot, a joint angle limit of the particular robot, or a length of arm reach of the particular robot.

In some implementations, the method further includes dividing each of the candidate paths for the multiple robots into multiple path segments, wherein, for each of the candidate paths, each of the multiple path segments corresponds to movement over a different time period in a series of time periods. The series of time periods includes at least a first time period followed by a second time period. The method further includes determining adjusted paths for the multiple robots by sequentially evaluating swept volumes of path segments corresponding to a same time period in the series of time periods that includes adjusting the path segments that correspond to the first time period based on swept volumes for the path segments that correspond to the first time period; and after adjusting the path segments that correspond to the first time period, adjusting the path segments that correspond to the second time period based on swept volumes for the path segments that correspond to the second time period.

In some implementations, the swept regions include voxels, and the force vectors are directed outward from each of at least some of the individual voxels of the swept regions.

In some implementations, determining a path for a particular robot to travel based on the swept regions and the assigned magnitudes of the forces includes: determining an updated path by elastically stretching a particular candidate path for the particular robot, the updated path maintaining a same start location and end location as the particular candidate path while bending in response to the force vectors, the particular candidate path being stretched based on the force vectors to avoid the swept regions for the multiple robots. The amount that the particular candidate path is stretched changes non-linearly so that the amount of change in response to a unit of force decreases the farther the updated path deviates from the particular candidate path.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
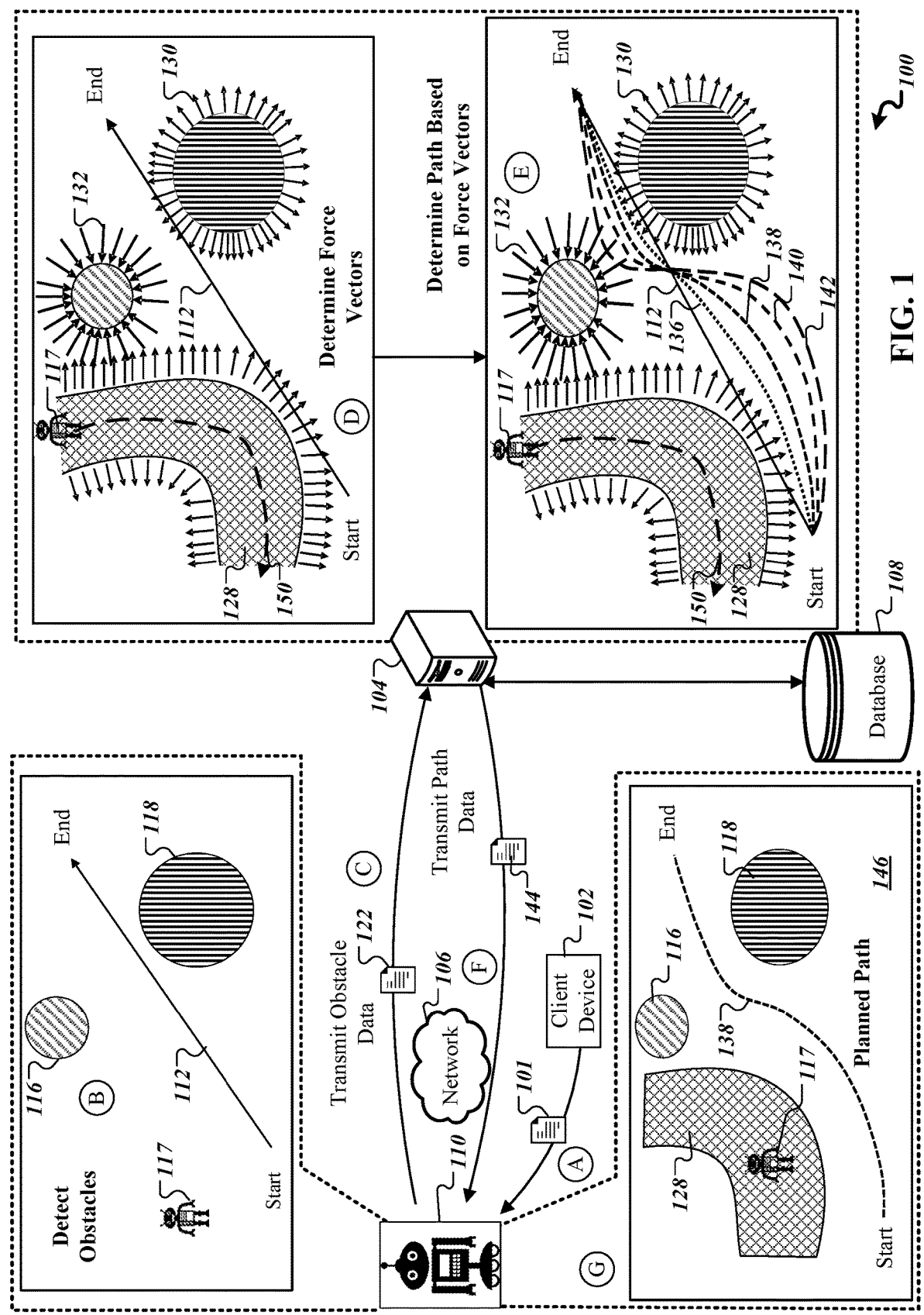
FIG. 1 is a block diagram that illustrates an example of a system for robot motion planning.

FIG. 1 is a block diagram that illustrates an example of a system 100 for robot motion planning. The system 100 includes a client device 102, a server system 104, a network 106, a database 108, and a robotic system 110. The example shown in system 100 shows the client device 102 instructing a movement of the robotic system 110 (referred to as robot 110 below), for example, to move to a destination (marked "End"). The system 100 plans a path for the robot 110 to reach the destination. The planned path may involve travel of the entire robot 110 or may involve movement of only a part of the robot 110. The planned path can be determined by modifying a candidate path to deform around obstacles. For example, force vectors can be associated with obstacles, and the candidate path can be elastically bent based on the force vectors. The example of FIG. 1 shows the planning of a path for a robot 110 in an environment. The system 100 can also be used to plan paths for each of multiple robots that may interact with the environment and/or with each other, and may move in proximity to each other. FIG. 1 illustrates various operations in stages (A) to (G), which can be performed in the sequence indicated or in another sequence.

Many applications of robotics include the use of multiple robots operating in proximity to each other. For example, in a manufacturing setting, multiple robots may all perform tasks in a shared workspace, for example, to manipulate portions of a same workpiece or assembly. In this type of setting, there is significant risk that the different robots may interfere with each other by causing collisions or blocking each other. Without appropriate planning, the movements of the various robots may cause damage due to collisions or delay as robots block other robots from accessing required areas. To determine effective paths, the path for one robot may be planned taking into account the paths of future motion planned for other robots in the same workspace. In effect, a planning system can choreograph the movements of multiple robots to complete a complex task, planning the paths for the robots in advance to allow each robot to efficiently move around each other as needed. This type of advance planning can be particularly useful when the paths will be used repeatedly, for example, to manufacture multiple items of the same type. Nevertheless, when the movement of many robots affect each other, planning paths that are effective, efficient, and safe can be computationally difficult.

As discussed further below, elastic path planning can be used to efficiently determine paths that account for future movement of other robots. The process can be performed efficiently by determining swept regions representing the spaces that different robots will pass through over a period of time. These swept regions can be aggregated to identify regions with different levels of overlap among the swept regions. Then, those swept regions combined, including areas of identified overlap, can be used to direct elastic path adjustment, which can be much more efficient than individually accounting for every robot path.

The system can use this technique to determine paths for different robots in an iterative manner. For example, if paths are being planned for five robots, the path for robot 1 can be planned based on the combined swept volumes of initial candidate paths for robots 2-5. Then, the path for robot 2 can be planned based on the combined swept volumes for the updated path for robot 1 and the initial candidate paths for robots 3-5. Next, the path for robot 3 can be planned based on the combined swept volumes for the updated paths for robots 1 and 2 and the initial candidate paths for robots 4 and 5. In this manner, the system can continue to adjust and refine paths for each of the robots based on the most current planned paths for the other robots that will be operating nearby.

In general, a robot refers to a programmable machine with one or more components that can be capable of performing a series of actions at least partially autonomously. For example, a robot may be capable of carrying out tasks that involve interacting with an object, changing a physical surrounding of the robot (e.g., arranging or manipulating objects), and maneuvering around the physical environment of the robot in a smooth and efficient manner. Besides responding to inputs and commands from humans, robots may initiate actions of their own accord, based on their programming and conditions they detect from their sensory components. A robot, such as the robot 110, may include one or more components for interacting with (e.g., physically manipulating and maneuvering) objects in an environment, such as system 100. For example, a robot may include an arm with an actuator to grasp or otherwise move objects. The actuator may be a robotic hand with finger-like elements to grasp objects. In some implementations, an arm or leg of the robot 110 can include one or more components that allow an end effector of the arm or leg to move in 6-degrees of freedom (DOF).

A robot, such as the robot 110, can include one or more motorized elements, such as wheels, legs, continuous tracks, and others, to allow the robot 110 to travel from one location to another location. Additionally, the robot 110 may include navigational components, such as GPS sensors and accelerometers, allowing the robot to set a course of movement and travel along a self-directed path. In some implementations, as shown in FIG. 1, the robot 110 may have a path planned for it by an external system, such as the server system 104. The robot 110 may thus use its capabilities to move along the path that it is instructed to follow. The robot 110 may include sensor capabilities that includes one or more sensors connected externally to the robot 110, allowing the robot 110 to perceive and learn of its surroundings. The robot 110 can include one or more body components, such as a chassis, a head, and other connecting components. The body components may allow for various types of motion of robot components relative to each other, such as rotating, swiveling, shifting, translating, etc. Robots can include various other components, such as batteries to power the robot, transmitters, receivers, sensors, processors, and memory to store data and programmed instructions for the robot. These aspects will be further described below with respect to FIG. 2.

In the example of FIG. 1, the server system 104 plans a path 138 for the robot 110 to move from a starting location to an ending location. The objective of moving from a starting location to an ending location can be based on an instruction provided from a user, a determination by the robot 110 to move in order to complete a task, data from the server system 104 or another planning system, an instruction provided from client device 102, or other data. The path may be a path for the robot 110 to move its body to travel from one location to another location (e.g., for the robot 110 itself to be translated to the ending location). Additionally, or alternatively, the path may represent movement of only a portion of the robot 110, such as movement of one of the robot 110's components, such as its arm, chassis, legs, and manipulator, from a starting location to an ending location. The path may specify changes in location as well as a pose or configuration of the robot, such as moving the robot from one room of a factory to another room and also moving a robotic component from a starting height to an ending height while travelling in the factory.

In some implementations, the path planning operations illustrated in FIG. 1 may be performed by the server system 104. In other implementations, the path planning may be performed by components of the robot 110. In other implementations, both the server system 104 and the robot 110 may share tasks for path planning.

The system 100 determines a path 138 for robot 110 to travel from a starting location to an ending location while avoiding obstacles in the vicinity the path. An "obstacle," as used herein refers broadly to an external constraint on movement of a robot. These external constraints include but are not limited to physical barriers (e.g., objects blocking movement or that could cause a physical collision). Other obstacles can be represent time-varying collision risks or even intangible constraints, such as a need to avoid areas where other robots or objects will travel, areas of high traffic, and areas avoided due to preferences or safety considerations.

The example shown in FIG. 1 involves the robot 110 detecting obstacles and providing data representing the obstacles to the server system 104. The server system 104 plans a path for the robot 110 using an elastic path planning technique. This includes generating force vectors associated with the obstacles. The force vectors can each have a magnitude and direction based on characteristics of the obstacles. The server system 104 generates one or more paths that bend around the obstacles due to the influence of the force vectors, while still maintaining the robot's overall movement from the starting location to the ending location. The server system 104 selects a path from the multiple paths, for example, based on the selected path meeting a predetermined set of criteria. The server system 104 then provides path data 144 for the planned path 138 to be traversed by the robot 110.

During stage (A), a destination for the robot 110 is determined. In some implementations, the server system 104 determines the destination based on a task to be performed by the robot 110. For example, the server system 104 may assign a task to the robot 110 as part of a manufacturing effort involving coordinated action of multiple robots, and the server system 104 may specify the destination as being needed to complete at least a portion of the task.

In some implementations, a user may specify the destination, for example, by speaking or interacting with the robot 110 or by entering data to a client device 102. As another example, the server system 104 may provide data specifying a destination to the robot 110. As another example, the robot 110 may determine its own destination based on sensed conditions, a scheduled task, or for another reason. In a manufacturing environment, the robot 110 may be assigned a task in order to move an item to another location in a manufacturing plant, and the robot 110 or the server system 104 may determine that the robot 110, or a portion of the robot 110, should move to the other location.

During stage (B), the robot 110 can observe its environment and identify potential obstacles, e.g., objects or conditions that may interfere with travelling to the destination. For example, the robot 110 obtains data from its sensors when perceiving the environment to indicate objects located between the robot's current location and its destination. For example, in order for the robot 110 to move to the destination across a room, the robot 110 determines that one or more obstacles (e.g., obstacles 116, 117, and 118) are present which may block or otherwise limit where the robot 110 may move. Detecting an obstacle may cause the robot 110 or another system (e.g., server system 104) to initiate path planning to obtain a path that reaches the destination and avoids the obstacles shown in environment 120 of system 100. If no obstacles exist in the straight-line path to the destination, the robot 110 can proceed to travel along the straight-line path 112 to the destination.

In some implementations, the obstacles 116, 117, and 118 found by the robot 110 within the environment 120 may impede the robot 110's movement. For example, the obstacles can include objects that pose harm to the robot 110, such as a flame, a cutting tool, or a collision risk. The obstacles can be stationary obstacles or dynamically movable obstacles. For example, some obstacles can move along a predetermined path, such as other robots moving along a planned path. Based on the other robots moving along a predetermined path, the robot 110 or the server system 104 can determine a swept volume of movement associated with the predetermined path. The swept volume for a robot, which will be further explained below, indicates a volume contains all points that the robot would pass through while travelling along its predetermined path. A swept area may alternatively be used, representing the sum of all areas that the robot would pass over along its path In some implementations, the robot 110 senses the environment 120 using one or more of its sensors that are integrated in the robot 110. The robot 110 can include sensors such as a camera, a LIDAR sensor, a radar sensor, a proximity sensor, an infrared sensor, an accelerometer, a touch sensor, a microphone, a depth camera, and a position sensor, to name a few examples. Other types of sensors may be used. For example, the robot 110 may include RGBD sensors that capture image data (e.g., red, green, and blue) as well as depth data. The robot 110 can receive the sensor data and analyze the sensor data to determine the obstacles along the straight-line path 112 from the robot 110's current location to the destination. The robot 110 may assess location, shape, color, size, volume, contour, texture, and other aspects of objects/obstacles to detect and identify objects.

The robot 110 processes the received sensor data of the environment 120 to generate characteristics of the obstacles found in the environment. For example, as illustrated in system 100 in environment 120, after the robot 110 has captured sensor data of the obstacles (e.g., obstacles 116, 117, and 118), the robot 110 processes the sensor data to identify characteristics of the environment 120. The robot 110 generates obstacle data 122 from the characteristics of the sensor data. The obstacle data 122 may include a representation of the location, color, size, contour, depth, shape, texture data, and other data of the obstacles 116, 117, and 118, as noted from the sensors.

During stage (C), the robot 110 sends the obstacle data 122 to the server system 104. Optionally, the robot 110 may transmit a request to the server system 104 to determine a path for the robot 110 to travel. Of course, in cases where the server system 104 is directing or coordinating the operations of the robot 110, the server system 104 may initiate the path planning process without receiving a communication from the robot 110.

The obstacle data 122 can indicate a location of identified obstacles within environment 120 (e.g., obstacles 116, 117, and 118), as well as characteristics describing the obstacles, such as, for example, the size and/or shape of the obstacles. The obstacle data 122 may indicate other properties of the obstacles 116, 117, and 118 such as a recognized type or category of the obstacles 116, 117, and 118. The robot 110 can also generate and include a map of the obstacles identified. Using the obstacle data 122, the server system 104 can determine the locations and characteristics of the obstacles 116, 117, and 118. Additionally, the robot 110 can provide other information to the server system 104 in the obstacle data 122, such as data indicating the current location of the robot 110, data indicating the destination for the robot 110, an identifier for robot 110, a task or instruction 101 (e.g., provided by a user or client device 102) that the robot 110 is attempting to carry out, and a location of the environment 120. Other details may be provided by the robot 110 for use by the server system 104 in determining a path.

During stage (D), the server system 104 analyzes the obstacle data 122 and calculates force vectors associated with obstacles found in the obstacle data 122. In addition, or as an alternative, the server system 104 may calculate force vectors based on obstacles or conditions that the server system 104 is aware of based on data from other sources, such as maps of the area, task plans, sensor data from other robots, etc. The server system 104 can analyze characteristics that describe the obstacles and generate force vectors based on these characteristics. For example, the server system 104 can use the location, shape, color, size, volume, contour, texture, and other aspects of objects to identify the objects and generate corresponding force vectors. The force vectors can each have a magnitude and direction of force potential that can affect a robot's path. For example, the force vectors can be attractive or repulsive forces. Similarly, the force vectors can be oriented in different directions in 2D or 3D space, and some force vectors may act have larger magnitudes than others in order to influence the path of the robot 110 more strongly.

In some implementations, the generated force vectors can radiate outwards from an object or obstacle in a uniform fashion or extend toward an object or obstacle in a uniform fashion. In other implementations, the force vectors can radiate outwards or extend inward in a non-uniform fashion. For some objects or portions objects, force vectors may radiate outward to repel the path of the robot 110. For other objects or portions of objects, force vectors may be directed toward the object to attract the path of the robot 110. The uniformity or the non-uniformity of the force vectors can be based on the parameters that describe the objects or obstacles themselves. For example, a server system 104 may associate repelling force vectors with a barrier and may associate attractive force vectors with a tool that the robot 110 may use.

In some implementations, the server system 104 generates the force vectors to ensure the robot 110 is not harmed during its movement along the path. Based on a degree of potential harm caused by an obstacle, the server system 104 may generate force vectors to adjust the path planned of motion for robot 110 to avoid the obstacle. For example, if the server system 104 determines the obstacle presents a high risk to the robot 110, the server system 104 may associate stronger force vectors (e.g., larger magnitude) for the obstacle in a direction that repels the robot 110 from the particular obstacle. Alternatively, if an obstacle poses a small risk of harm, the server system 104 may employ weaker force vectors having smaller magnitudes.

The server system 104 can take into account current and/or future movement of objects when determining force vectors. In particular, the server system 104 may plan and schedule the movements of multiple robots, such as a fleet of robots, some of which may work in the same areas at the same time. The server system 104 can use the planned paths for other robots, even if the paths are not fully finalized, to determine and adjust the path of the robot 110. For example, the server system 104 can determine that an object, such as a robot 117, is scheduled to move along a path 150 at the same time that the robot 110 moves along its path to the destination. Based on characteristics of the robot 117, such as shape and orientation of the robot 117, the server system 104 can determine a swept region 128 based on a planned path for the robot 117. The swept region 128 includes the entire region that the robot 117 would pass through over the time that the robot 115 travels along the path 150. If the path of the robot 110 is planned using two-dimensional representations, the swept region 128 may be a two-dimensional area. If the path of the robot is planned using three-dimensional representations, the swept region 128 may be a three-dimensional volume. The server system 104 can generate force vectors that radiate outwards from the swept region 128 that represents the robot 117 travelling along the path 150. For example, the server system 104 may treat the entire swept region 128 as an obstacle to be avoided.

The server system 104 can represent force vectors and spatial relationships using any appropriate data structures or techniques. FIG. 1 shows graphical representations of paths, objects, and force vectors for clarity in illustration, but the server system 104 can generate data structures representing positional relationships and force vectors without generating any visualizations. Optionally, visualizations of a robot's environment, including features such as paths and force vectors, may be generated and provided to a user.

In some implementations, a force vector may have a different magnitude at different spatial locations. For example, at the surface of an object the magnitude of a force vector may be high, and moving away from the object, the magnitude may decrease according to a function. Thus, the force vector may have a high degree of influence on a path at one location, but have a lower degree of influence on a path at a different location. As an example, the force vector for an obstacle may repel a path strongly when the path passes one foot from the obstacle, but the same force vector may repel a path much more weakly when the path passes three feet from the obstacle. The variation of magnitude of a force vector at different positions may be based on, for example, a user-defined function, a linear function, a quadratic function, an exponential function, a logistical function, or other types of variations.

The force vectors may also vary in magnitude and direction depending upon the type of obstacle the force vectors correspond to. For example, the magnitudes of force vectors that repel a robot path away from a box of durable and inexpensive components may be much less than magnitudes of force vectors that repel a robot path away from another robot or a fragile item, where the results of a collision may be more severe.

During stage (E), the server system 104 generates the planned path 138 for robot 110 based on the generated force vectors. As noted above, the force vectors represent various influences on the path of motion of the robot 110, especially the influence of obstacles and the activity of other robots in constraining the path of the robot 110. The planned path 138 may be one that avoids the obstacles in the environment of the robot 110 and represents a modified version of the initial candidate path 112. For example, the sever system 104 can alter the initial path 112 by bending the initial path 112 in an elastic manner based on the force vectors, while still reaching the same destination as the initial path 112. The server system 104 may generate, from the initial path 112, multiple paths (e.g., paths 136, 138, 140, and 142) that modify the initial path 112 in different ways. The server system 110 can select and provide to the robot 110 the selected path 138, selected from among the various path options, that best fits a predetermined set of criteria.

In some implementations, in generating a planned path 138, the server system 104 modifies or alters the initial path 112 based on the combined influence of the force vectors generated in stage (D). For example, the server system 104 can determine how the force vectors, taken together, will affect the initial path 112. Attractive force vectors may pull the initial path 112 towards the source of the force. Repulsive force vectors may push the initial path 112 away from the source of the force. The amounts of force applied to the initial path 112 are based on the magnitudes of the force vectors, and the directions that the initial path 112 is stretched are based on the directions of the force vectors.

The robot 110 can have the ability to change its pose or configuration as it moves. To take advantage of this, the server system 104 may plan changes in the pose or configuration due to the force vectors. For example, in addition to specifying lateral movements of the robot 110 as a whole, due to the force vectors the server system 104 can generate the path 138 to include instructions for the robot 110 to alter its shape or orientation as it traverses the path 138. The robot 110 may need to adjust its shape, orientation, or position as it traverses the planned path 138. The robot 110 may rotate or translate to satisfy the constraints represented by the force vectors. Additionally, the planned path 138 may cause the robot 110 to move one of its components (e.g., such as an arm or leg) or adjust a component.

In some implementations, the server system 104 seeks to generate a path that minimizes the amount of deviation from the initial path 112, and/or reaches the destination with a minimum amount of distance or travel time. The server system 104 can adjust the characteristics of the initial path 112 based on the force vectors in differing ways to generate one or more path options that meet these aforementioned criteria, for example.

When planning the path for the robot 110, one of the parameters that the server system 104 may adjust is the level of elasticity or resistance of the initial path 112. The initial path 112 may be assigned a particular elasticity or resistance that affects the degree to which the initial path 112 responds to force vectors. The measure of elasticity for the initial path 112 can define a degree to which the initial path 112 is stretched in response to the applied force vectors. For example, for the same set of force vectors, assigning different levels of elasticity may result in paths with different levels of displacement from the initial path 112.

In general, the elastic path planning technique resists deviation from the initial path to some extent, so that the more a path is displaced the greater the magnitude of forces are less the path is displaced in response to further forces. This can be represented by a non-linear response to forces of different magnitudes. For example, a force with a magnitude of one may displace an initial path by one foot, a force with a magnitude of two may displace the same initial path by 1.5 feet, a force with a magnitude of three may displace the same initial path by 1.75 feet, and so on. The effect is that the bending a path results in a counteracting force, analogous to the tension created by stretching an elastic material, that increases resistance to further deformation and in particular increases lengthening of the path.

For example, as the server system 104 bends the initial path 112 due to the force vectors, an amount of tension or resistance to further deformation is created. The effect of this tension or resistance is to limit the amount that the adjusted path deviates from the initial path 112. Another effect is that the deviations from the initial path 112 are distributed along the adjusted path in proportion to the magnitudes of the forces applied. The tension can be adjusted based on the elasticity of a particular initial path 112. For example, the more elasticity found in the initial path 112, the less tension is created as the initial path 112 is altered, and thus, the farther the adjusted path may ultimately be displaced from the initial path 112.

For example, the server system 104 can assign a particular amount of elasticity to the initial path 112. The server system 104 can stretch the initial path 112 with the specified level of elasticity in response to the combined force vectors from each of the identified obstacles. At each portion of the initial path 112, deformations are determined based on the force vectors localized at that portion. The combined influence of the force vectors, with the resistive influence of the limited elasticity assigned for the initial path, result in an altered path. Different levels of elasticity result in different paths 136, 138, 140, and 142 (listed in order from lowest elasticity to highest elasticity). In this process, the starting point and ending point for the path can be fixed, so that the start and end are the same as for the initial path 112. In some implementations, the server system 104 may vary the elasticity during planning to achieve certain objectives, such as to achieve minimum clearance from obstacles, to meet travel time or travel distance constraints, to meet efficiency targets, and so on.

In some implementations, in addition to or instead of an elasticity parameter, the server system 104 may apply a constraint on the total length of the adjusted path. For example, the initial path 112 may be limited to being lengthened by no more than a particular amount or a particular percentage.

As discussed above, as the server system 104 introduces more undulations and bends to the altered initial path 112 in response to the force vectors, the harder it becomes for the server system 104 to stretch the initial path 112 based on subsequent force vectors. For example, if the altered initial path 112 has a high degree of resistance to elasticity, the less bending and deforming the initial path can undergo. Alternatively, if more elasticity is permitted, the updated path can deviate farther from the initial path 112, e.g., by bending away from the initial path 112 more strongly and being displaced farther from the initial path 112. In other words, higher elasticity presents lower resistance to changes from the initial path 112 in response to the force vectors.

In some implementations, the server system 104 may constrain adjustments to the initial path 112 based on characteristics of the particular robot 110 for which the path is being planned. For example, characteristics of the particular robot may affect how it can move along the altered initial path 112. These characteristics can include a speed limitation of the particular robot, a size of the particular robot, a joint angle limit of the particular robot, or a length of arm reach of the particular robot, among others. The server system 104 may constrain portions of the initial path 112 based on these characteristics of a robot and how a robot would move along the portion of the initial path 112. Additionally, the server system 104 can vary the elasticity at particular portions of the path based on these characteristics of the robot.

For example, as illustrated in system 100, the server system 104 generates four adjusted paths by altering the initial path 112 using different levels of elasticity. The four adjusted paths include paths 136, 138, 140, and 142. The server system 104 can generate a desired number of adjusted paths, for example, a predetermined amount or a number of paths determined based on one or more factors. Once the adjusted paths have been generated, the server system 104 can assign a score to each of the adjusted paths.

In some implementations, the server system 104 generates one or more scores to characterize properties for each of the adjusted paths. The scores may be generated at various steps along the path planning process to evaluate the different versions of the adjusted paths, and can be used to determine whether each adjusted path sufficiently meets the criteria or constraints. A score can be based on a variety of factors, such as deviation distance from the initial path 112, a number of turns, a path distance, magnitude of the amplitudes of the turns, a length of time it takes for the robot to traverse the adjusted path, and so on. The score of a particular adjusted path can increase or decrease in value based on values indicative of one or more of these factors. For example, the shorter the path distance or the smaller the magnitude of the amplitudes of the turn, the higher the score generated by the server system 104. The converse also holds true. Additionally, the server system 104 can predict a length of time it takes for robot 110 to traverse the initial path 112 and compare that length of time to a predicted length of time it takes robot 110 to traverse the adjusted path. Based on the time comparison, the server system 104 can set a corresponding score. For example, the closer the time difference is to zero, the higher the score corresponding to the adjusted path.

The server system 104 can also compare the generated score corresponding to the adjusted path to a threshold score. The threshold score can be determined based on a set of desired characteristics for a path. When the score for a particular adjusted path reaches the threshold level, the server system 104 can determine that the adjusted path sufficiently meets the applicable criteria, and the server system 104 can end the adjustment process. Similarly, if the server system 104 determines that the scores generated during successive adjustment iterations reach a plateau, indicating that further adjustment is not improving the path, the server system 104 may also end the adjustment process.

In some implementations, the server system 104 can determine a set of coordinates that indicate the planned path. The set of coordinates can include closely spaced coordinates that allow the robot 110 to follow the path from the starting location to the ending location. Alternatively, the representation of the adjusted path can be stored in other representations, such as waypoints and/or curves that allow the robot 110 to move along the path.

The server system 104 can store path data for the robot 110 in the database 108. The server system 104 can store data representing an identification of the robot 110 and data related to the planned path. For example, this data can include the set of coordinate points (e.g., GPS data), data representing the initial path 112, data representing the obstacle data 122, and other data representing the environment 120 shown in system 100. The data representing the obstacle data 122 can include a type or classification of the obstacles identified along with GPS location data of the obstacles found in the obstacle data 122. The path data for the robot 110 can be used to provide a path to the robot 110 and also to use in planning paths of other robots, such as the robot 117. For example, the planned path 138 for the robot 110 may be used to determine a swept region that will influence the path planning for the robot 117 and potentially other robots.

During stage (F), the server system 104 transmits the path data 144 representing the results of the path planning process to the robot 110 over the network 106. The path data 144 can include the coordinates specifying points (e.g., GPS coordinates) along the path 138. For example, the coordinates may include locations such as, the starting location, the ending location, and intermediate points along the path. The coordinates may be represented as GPS coordinates or may be expressed in another coordinate frame, such as a coordinate frame understood by the robot 110. In other implementations, the server system 104 provides a pointer, address, or index to the robot 110 that enables the robot 110 to retrieve the path data 144 from the database 108.

During stage (G), the robot 110 receives the path data 144. The path data 144 can be stored in local memory of the robot 110 (e.g., volatile or non-volatile memory). Alternatively, if the robot 110 determines that the system server 104 provided the pointer, address, or index to the robot 110, the robot 110 retrieves the path data 144 from the database 108.

In some implementations, the robot 110 can traverse the planned path in response to receiving the path data 144. The robot 110 can initiate movement to travel along the path 138 as shown in illustration 146 based data from the path data 144 (e.g., coordinate points). The path 138 shown in illustration 146 is generated based on avoiding the force vectors corresponding to the obstacle 116, force vectors corresponding to the obstacle 118, force vectors from the swept motion volume of the robot 117, and minimizing a deviation from the initial path 112. The generated path 138 has at least met or exceeded the predetermined thresholds set by the server system 104 and consequently, enables robot 110 to traverse the planned path 138 and reach the destination in an efficient and minimalistic manner.

As the robot 110 traverses the path (or in response to traversing the path), the robot 110 can transmit data regarding its journey on the path to the server system 104 over the network 106. For example, the robot 110 can provide in its data whether any new obstacles had been found, whether the previously identified obstacles were moved or removed, and whether the robot 110 received new instructions from a user or client device 102 during its traversal of the path 138. Alternatively, the robot 110 can indicate whether or not traversal of the path 138 was successful or not.

Figure 2:
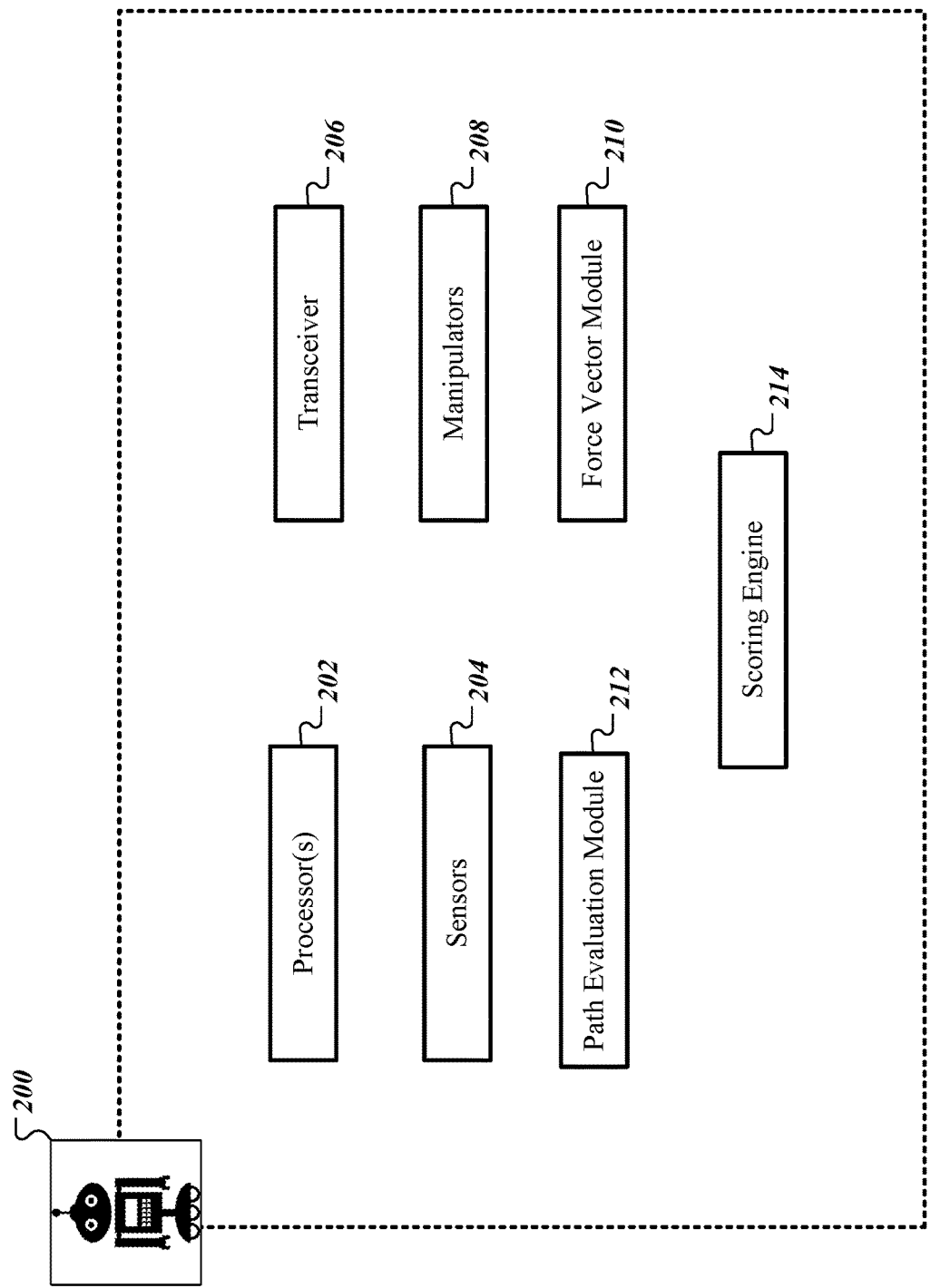
FIG. 2 is a block diagram that illustrates an example of a robot and associated components.

FIG. 2 is a block diagram that illustrates an example of a robot 200 and corresponding components. The robot 200 illustrates one or more components integrated within the robot 200. For example, the robot 200 can include one or more processors 202, one or more sensors 204, a transceiver 206, one or more manipulators 208 connected to the end of the robot 200's arms and/or legs, a force vector module 210, a path evaluation module 212, and a scoring engine 214. The robot 200 can additionally include other components as well. Each of the components illustrated in robot 200 can communicate with one another.

The one or more processors 202 control the decision making of the robot 200. In addition, the one or more processors 202 communicate with each of the other components in the robot 200. Additionally, the processors 202 communicate with one or more memory communicates found within the robot 200. The processors 202 can instruct each of the components in the robot 200 to perform desired tasks and respond to requests. The processors 202 can additionally perform processes or tasks sequentially or in parallel.

The one or more sensors 204 can analyze the environment within proximity to the robot 200. For example, the robot 200 can include sensors such as one or more cameras, LIDAR sensors, proximity sensors, motion sensors, infrared sensors, accelerometers, touch sensors, microphones, depth cameras, and position sensors, to name a few examples. The robot 200 can additionally generate data that includes LIDAR, 3D depth, radar data, imagery, and audio data, to name a few examples. The sensors 204 can be places internally within the robot 200 or externally on the robot 200.

The transceiver 206 can include one or more receivers and one or more transmitters. The transceiver 206 can allow the robot 200 to communicate bi-directionally over the network 106 with external components. For example, as illustrated in system 100, the transceiver within robot 110 can communicate with the client device 102, the server system 104, and the database 108. The transceiver 206 can communicate over different frequency bands and can be connected by a wired or wireless connection over the network 106.

The one or more manipulators 208 can be attached to the end of each of the robot 200's arms or legs. For example, the end of robot 200's arms or legs can include one or more manipulators 208 that perform tasks in response to instructions transmitted by the processors 202 or the transceiver 206. The one or more manipulators 208 may be instructed to open, close, and/or stabilize or grasp an object or the ground. The manipulators 208 may have finger like or clamp like objects to grasp objects.

As shown in the example of FIG. 1, the server system 104 was illustrated as determining force vectors for obstacles and generating a path based on an initial path, force vectors representing constraints, and elasticity of the initial path. FIG. 2 illustrates that these techniques, as described with respect to FIG. 1, can optionally be performed, at least in part, by a robot in some implementations, using a path evaluation module 212, a force vector module 210, and a scoring engine 214.

The force vector module 210 can include one or more software and hardware components that generate force vectors based on identified obstacles, as described with respect to FIG. 1. For example, the force vector module 210 can analyze the identified obstacles from the robot and generate force vectors based on these characteristics. The force vectors can indicate a magnitude and direction of force potential from the object or obstacle that affect robot 200's planned path. The force vectors can be attractive force or repulsive forces. Additionally, the force vectors can be uniform in direction and magnitude in surrounding the perimeter or exterior of an obstacle (e.g., an object or swept region). Alternatively, the force vectors can be non-uniform in direction and magnitude in surrounding the circumference of the obstacle.

The path evaluation module 212 can include one or more software and hardware components that generate a planned path for robot 200 based on the generated force vectors for the detected obstacles and other constraints. For example, the path evaluation module 212 generates planned path data by generating a candidate path for the robot, bending the candidate path for the robot around the force vectors corresponding to the detected objects, and maintaining a similar trajectory to the trajectory of the initial path. As described with respect to FIG. 1, in response to generating the force vectors of the detected obstacles, the path evaluation module 212 deforms or bends the initial path 112 (based on its elasticity) to avoid the force vectors while minimizing the amount of deviation from the initial path. For example, the bending and/or deforming is performed in a direction opposite to the direction produced by the force vectors so as to avoid the robot 200 intersecting with the obstacle(s).

The scoring engine 214 can include one or more software and hardware components that determine a score for a path produced by the path evaluation module 212. For example, the scoring engine 214 generates the score for various paths based on their characteristics. The characteristics used for scoring can include the distance that a path deviates from the initial path 112, a number of turns found along the path, an overall distance of the path, a magnitude of the amplitudes of the turns, a length of time it takes for the robot to traverse the path, and a distance of the path to the force vectors. The smaller number of turns and the shorter the overall path distance of the path, the higher the score generated by the scoring engine 214, for example. Alternatively, if the deviation distance from the initial path is high or a magnitude of the amplitudes of the turns is high, the scoring engine 214 may generate a lower score, for example. The path evaluation module 212 can generate multiple paths (each different from one another) for a particular environment. The scoring engine 214 can generate scores for each path of the multiple paths. The robot 200 can select and move along the path with the highest score (e.g., the planned path). Additionally, the scoring engine 214 may compare each of the generated scores to thresholds to determine whether the corresponding path meets the desired criteria.

Figure 3:
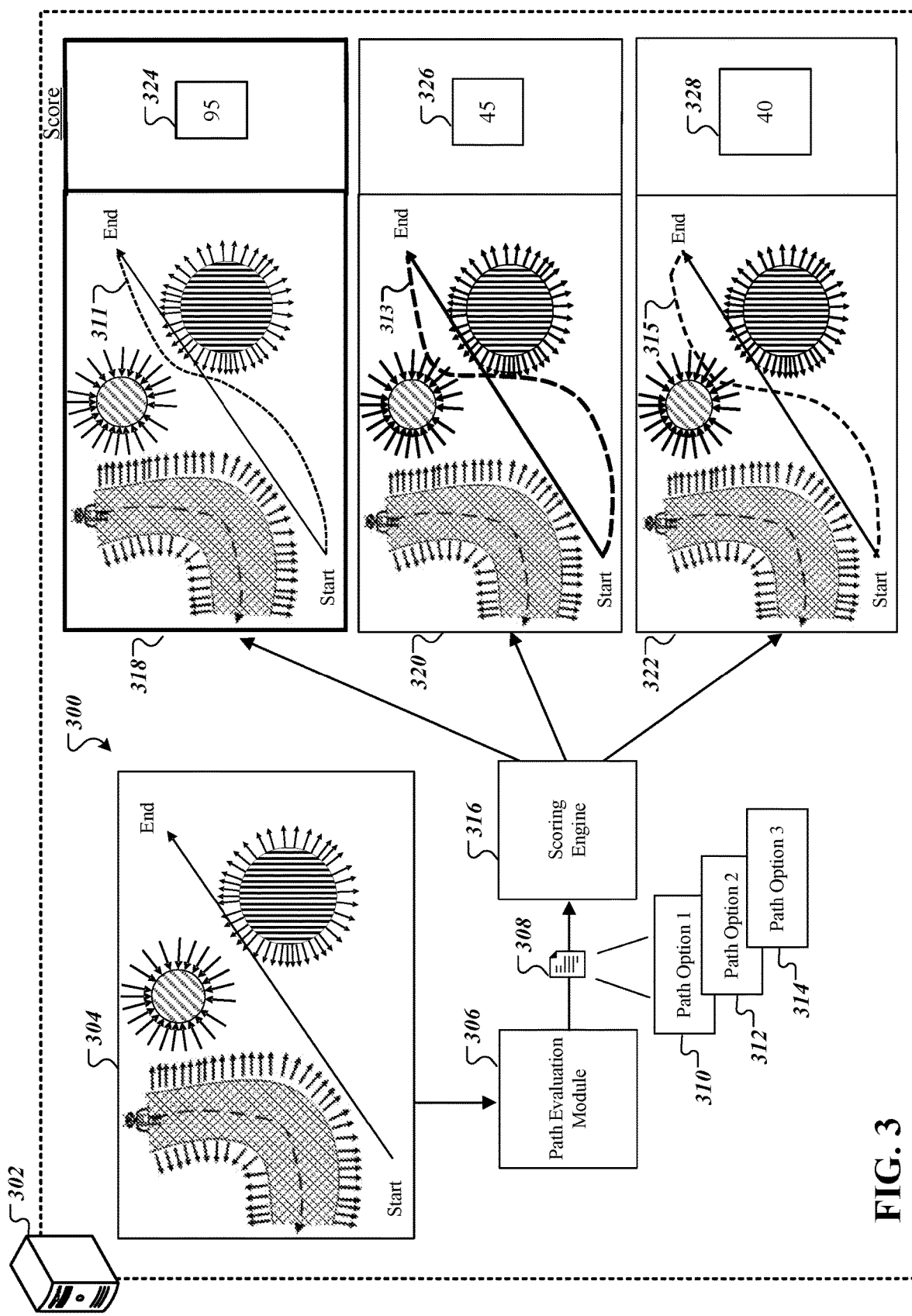
FIG. 3 is a block diagram that illustrates an example of a system for scoring robot motion planning.

FIG. 3 is a block diagram that illustrates an example of a system 300 for scoring robot motion planning. For example, the system 300 illustrates the functions performed by the path evaluation module 306 that generates candidate paths and a scoring engine 216 that assigns scores to each of the candidate paths. The functions performed by the server system 302 includes generating force vectors corresponding to obstacles identified in an environment, such as those force vectors shown in illustration 304. The server system 302 calculates the force vectors and provides the representation shown in illustration 304 that may be included in a mapped environment, to the path evaluation module 306.

The path evaluation module 306 analyzes the data found in the illustration 304 to generate one or more candidate paths that have a similar trajectory to the initial path. In some implementations, the path evaluation module 306 generates path data 308 that include multiple candidate paths to traverse the illustration 304. For example, the path data 308 can include a first candidate path 310, a second candidate path 312, and a third candidate path 314. Each of these candidate paths can include one or more series location coordinates for traversing the robot from the starting location to the ending location shown in the illustration 304. These location coordinates can be GPS coordinates or some other coordinates understood by both the robot and the server system 302.

In some implementations, the path evaluation module 306 provides the path data 308 to a scoring engine 316. The scoring engine 316 generates a score for each respective candidate path. For example, as illustrated in system 300: the path 311 corresponds to candidate path 310 in illustration 318; the path 313 corresponds to candidate path 312 in illustration 320; and, the path 315 corresponds to candidate path 314 in illustration 322. The scoring engine 316 generates a score for each candidate path based on an indication of, for example, deviation distance from the initial path, overall path distance, amplitude of the turns in the candidate path, and distance between the candidate path and the force vectors, to name a few examples. In the example shown in system 300, the scoring engine 316 generates a score 324 having a value of "95" for path 311. The scoring engine 316 generates a score 326 having a value of "45" for the path 313. Additionally, the scoring engine 316 generates a score 328 of having a value of "40" for the path 315.

In some implementations, the scoring engine 316 can generate the score based at least on a magnitude of the amplitude of the turns and the deviation distance of the candidate path from the initial path. Based on the amplitude of the turns being low and the deviation distance of the candidate path from the initial path being low, the scoring engine 316 generates a high score (e.g., score 324 of "95") corresponding to a candidate path, for example. Other factors, as mentioned above, can be used by the scoring engine 316 to generate a corresponding score.

As illustrated in system 300, the scoring engine 316 generated low scores for paths 313 and 315 found in illustrations 320 and 322, respectively. For example, as shown in illustration 320, the path 313 intersects with force vectors and includes turns that have a large magnitude in its amplitude. Additionally, large magnitudes in amplitudes create a larger overall path distance. Thus, the scoring engine 316 associates a low score 326 of value "45" to attribute to the path 313 because of the intersection with the force vectors and the large magnitude in the amplitude of the turns. Similarly, the scoring engine 316 associates a low score 328 of value "40" because the path 315 intersects with the force vectors and comes in close proximity to the obstacle. Since path 315 produces a potential harm to a robot traveling along the path 315, the scoring engine produces the low score 328 for the corresponding path 315.

Figure 4:
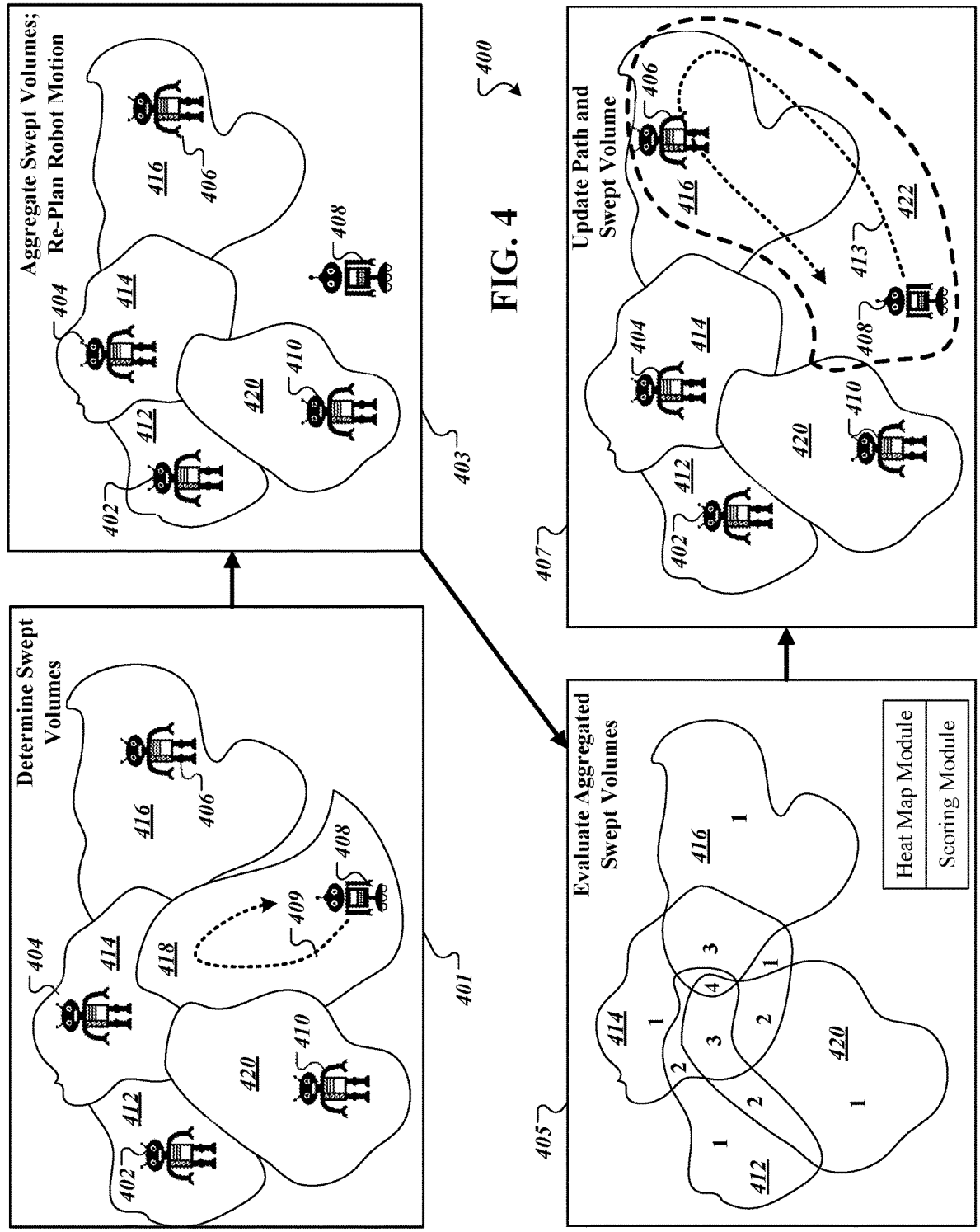
FIG. 4 is a block diagram that illustrates another example of a system for robot motion planning.

FIG. 4 is a block diagram that illustrates another example of a system 400 for robot motion planning. Generally, the system 400 illustrates path planning in the context of movements of multiple robots. For example, the system 400 seeks to generate motions for a particular robot in view of the multiple other robots to avoid a highly congested area. For example, if many robots occupy a certain volume of space, than a particular robot can move along a path that avoids the highly congested volume of space in order to avoid collision with the other robots.

As illustrated in FIG. 4, system 400 illustrates a process by which a path is determined for a particular robot in view of movement of other robots. For example, system 400 illustrates robots 402, 404, 406, 408 and 410. The system 400 may have more or fewer robots than is illustrated. Each robot has a corresponding candidate path of movement. These can be considered candidate paths because each may be subject to further adjustment, including based on adjustments to the paths of the other robots. The path of movement for each robot may include moving from a starting location to an ending location. The movement specified by a path correspond to moving a particular component of the robot or moving the entire robot itself. For example, as shown in illustration 401, the robot 408 may have a candidate path 409.

Based on the candidate path of movement for a particular robot, a server system can determine a swept region of movement with the candidate path of movement. The swept region of movement illustrates a region of movement for a particular robot as the robot moves along the candidate path. The region of movement is indicated by a potential size, shape, movement, reach of the particular robot, and so on. The region shows the farthest point the robot may be able to reach at each point along the candidate path. For example, at a particular point along the candidate path, the robot may rotate, reach one or more arms, or change shape, which may change the overall region of swept movement for the particular robot. For example, as shown in illustration 401, robot 402 has a swept region of movement defined by region 412; robot 404 has a swept region of movement defined by region 414; robot 406 has a swept region of movement defined by region 416; robot 408 has a swept region of movement defined by region 418; and, robot 410 has a swept region of movement defined by region 420.

In some implementations, the swept region of movement corresponds to dynamic movement of the robot, e.g., predicted movement of the corresponding robot in a period of time as it travels along the robot's candidate path. As illustrated in system 400, some portions of the regions corresponding to each of the robots stack on top of one another. The stacked regions indicate highly congested areas or areas where the robots may collide with one another. For example, the stacking of regions 420, 418, and 414, indicate the likelihood that robots 410, 408, and 404 may collide with one another. Alternatively, the areas that do not stack with one another indicate safe regions for the corresponding to exist without colliding As an example, path 409 corresponds to how robot 408 moves within the region 418. As the robot 408 moves along the path 409, the volume of space that the robot 408 takes up is depicted by the region 418. The region 418 includes potential movements made by the robot 408 while traversing the path 409 that include extensions of reach by the arms of the robot 408, the shape of the robot 408, and positioning of the robot 408. However, the region 418 illustrates how the potential movement of robot 408 along the path 409 will intersect with regions 414, 416, and 420 corresponding to the other robots.

The illustration 403 shows how robot 408 views the potential swept regions of the other robots 402, 404, 406, and 410. For example, the server system can aggregate the swept regions for each of the robots from the point of view of robot 408, where each swept region for a particular robot is different from one another. Additionally, the server system can aggregate swept regions for each of the robots from the point of view from each of the robots. Thus, each robot can have a different view of the aggregation of the swept regions corresponding to each of the other robots. For example, robot 406 can view the aggregation of the swept regions for robots 402, 404, 408, and 410.

In view of the potential swept regions of the other robots, the path 409 of the robot 408 is subsequently re-planned to avoid the highly congested region of the other robots (e.g., the overlapping portions of stacked swept regions). The robot 408 and/or a server system that is in communication with the robot 408 can perform the re-planning of the robot 408's motion (e.g., server system 104).

In some implementations, the server system aggregates the swept regions and associates costs with each of those regions. For example, the illustration 405 visualizes a cost assigned to each of the swept regions corresponding to each of the other robots. A higher score is associated with regions of greater degrees of overlap among swept regions. Similarly, a lower score is associated with regions of lower degrees of overlap among swept regions. The swept regions may overlap at a particular level or overlap by some degree of overlay. In this manner, the regions and corresponding costs, shown in illustration 405, act in a "heat-map" manner. Typically, the regions associated with the highest costs are denoted as hot spots or hot regions on the heat-map. Likewise, regions associated with lower costs are noted as cold spots or cold regions on the heat-map. For example, as shown in illustration 405, the heat-map scores range from a high score of "4" to a low score of "1." The robot 408 or the server system generates the high score of "4" by noting a region that includes regions of 412, 414, 416, and 420. In another example, each of the individual regions that do not have any overlapping regions are associated with a low score of "1." The robot 408 or the server system associates costs with each of these regions in order to assist with determining a re-planned path for the robot 408.

Based on the costs associated with each region of the swept regions, the server system generates force vectors based on the cost. For example, the force vectors generated can be repulsive force vectors that are directly proportional to the cost. Thus, the force vectors that have the greatest magnitude stem from regions associated with the highest cost (e.g., overlapping regions with a cost of "4"). The force vectors repel outwards from the region with the highest cost. Regions that have a lower cost, e.g., regions with a cost of "3" or "2," have force vectors that repel outwards but have a smaller magnitude than the force vectors associated with regions having a cost of "4." In some implementations, the force vectors from these regions may repel outwards uniformly from the epicenter of the region. Alternatively, the force vectors from these regions may repel outwards non-uniformly from the epicenter of the region. The non-uniformity may be based on the shape, volume, locations of overlapping with other regions, and other criteria. In other implementations, the force vectors associated with these costs can be attractive forces vectors that are directly proportional to the cost. The higher the cost, the greater the magnitude of the force vectors. The force vectors are additionally associated with the swept regions corresponding to each of the other robots (e.g., robots 402, 404, 406, and 410). The force vectors are not associated with the robot 408, which is the robot that is in focus. Similarly, for a different robot in focus (e.g., determining a path for that different robot), the force vectors will be associated with the other robots and not the different robot.

In some implementations, the aggregate swept regions corresponding to each of the robots may each include force vectors that can be analyzed as a complex vector field. In the complex vector field, the force vectors can each be assigned a magnitude and direction at each point in the illustration 405. The magnitude and direction can be based on the costs associated with the regions at each of the points in space. In some implementations, the force vectors can be measured in a two-dimensional space and the swept regions of movement can be measured in a two-dimensional space. In other implementations, the force vectors can be measured in a three-dimensional space the swept regions of movement can be measured in a three-dimensional space.

In the case of three-dimensional swept regions, the server system processes the region to determine force vectors for the regions. For example, the server system can define a voxel, or a three-dimensional pixel, within each portion of the region. A voxel can be located at just the exterior of the region or locations where the regions overlap one another in three dimensions. The server system can associate a cost for each individual voxel. Subsequently, the server system can then associate an attractive or repulsive force vector corresponding to each voxel in the system. In two-dimensional planning, the server system can assign pixels and corresponding two-dimensional force vectors based on the cost assigned to the pixels.

Based on the assigned force vectors for each of the costs, the server system can generate a re-planned path for the robot 408. For example, as shown in illustration 407, the server system can generate a new path 413 for robot 408 that is in focus. The new path 413 for robot 408 can be generated to avoid the forces vectors corresponding to the swept regions of the other robots. The candidate path is generated based on the steps and methods described with respect to stage (E) of FIG. 1. For example, deforming and bending the initial path 409 to avoid the force vectors, while reaching the same destination of the initial path 409. Additionally, the initial path 409 is bent and deformed around the force vectors based on the elasticity of the initial path 409. In some implementations, once multiple candidate paths are generated, an planned path is selected based on the scores of the multiple candidate paths and criteria being met and provided to the robot 408. For example, the candidate path 413 as shown in illustration 407 is the path for the system 40.

Additionally, based on the new path 413 that was generated, a corresponding new swept movement volume 422 that indicates a swept movement volume for robot 408 is also generated. The swept region 422, illustrated by the dotted enclosure, shows a new region that robot 408 may move within along its updated path. That movement can be based on the shape, volume of movement, and reach of the robot along each point of the path 413. This system for determining robot movement ensures that multiple robots moving in a framework can avoid collision with one another. Based on the next or other robot to process, the system can generate force vectors for region 422 to apply to a different robot's candidate path processing.

In some implementations, this process performed for robot 408 may be iteratively performed for each of the other robots 402, 404, 406, and 410. For example, robot 402, robot 404, robot 406, or robot 410 may be the focus of processing, and the system can analyze the other robots swept motion volumes without analyzing the swept motion volume of the robot in focus. For example, this process may occur until each of the cost regions is below a threshold value, such as "2" or another cost value, for example. In another example, this process may occur iteratively until no overlap regions exist. If the adjustment process plateaus and cannot reduce further past a particular cost score, the adjustment process will end.

Figure 5:
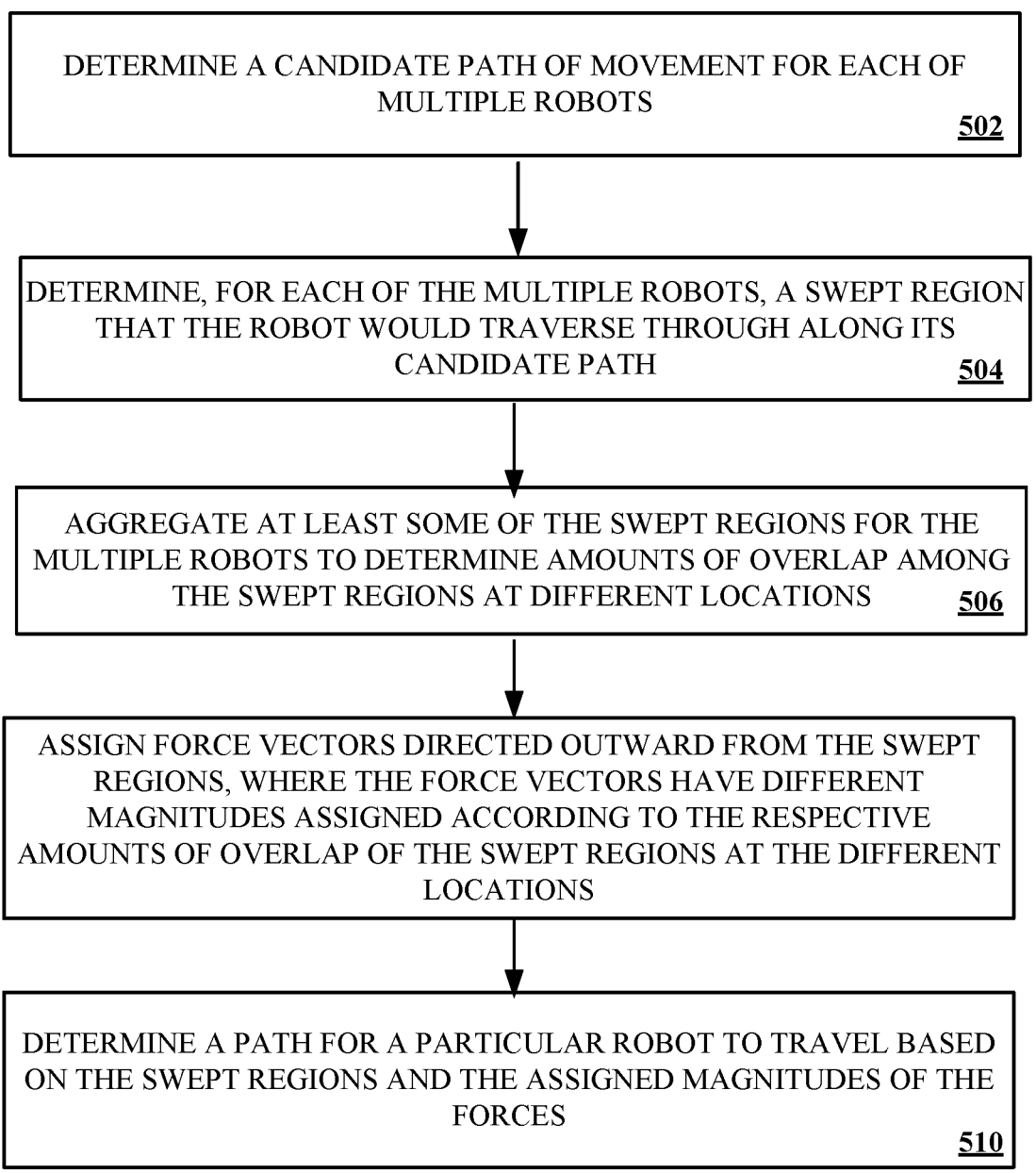
FIG. 5 is a flow diagram that illustrates an example of a process for robot motion planning.

FIG. 5 is a flow diagram that illustrates an example of a process 500 for robot motion planning. The process 500 may be performed by one or more computing devices, for example, a local computer system separate from a particular robot, a remote computer system, one or more processors of the robot, or any combination thereof. In this description below, this is noted by reference to a computing system that can represent any of these computing devices, combinations, or other computing devices.

During 502, a candidate path of movement is determined for each of multiple robots. The candidate path may extend from an origin to a destination. For example, the robot may receive an instruction to move along the candidate path that extends from the origin (e.g., a robot's current location or another location where the robot may begin the path in the future) to the destination. The origin and the destination can be defined by a series of coordinates, such as GPS coordinates or coordinates understood by the robot and corresponding system server.

In some implementations, the robot can determine a first path to travel using its one or more sensors located on its chassis or located on the robots arm (e.g., externally or internally on the robot). For example, the robot 408 can include sensors to capture characteristic data of the environment that includes one or more obstacles. The sensors can include RGBD sensors, a LIDAR sensor, a radar sensor, a proximity sensor, an infrared sensor, an accelerometer, a touch sensor, a microphone, a depth camera, and a position sensor, to name a few examples. The robot 408 can use this data to generate information about the environment and information describing the obstacles, such as, for example, shape, contour, size, depth, and location of the obstacles. Additionally, the robot 408 can also capture audio data and/or other data while analyzing the environment. Each of the robots, such as the robots shown in system 400, can perform this step to determine a candidate path. Additionally, the server system may provide a candidate path for the robot to move to an end destination.

During 504, a swept region for each of the multiple robots is determined that the robot would traverse through along its candidate path. Based on the candidate path of movement for a particular robot, the server system or the robot can associate a swept volume of movement with the candidate path of movement. The swept volume of movement illustrates a region of movement (e.g., in three-dimensional space) as the robot moves along the candidate path of movement. The region of swept is indicated by the potential size, shape, movement, reach of the particular robot's component, and so on. For example, the region shows the farthest point the robot may be able to reach at each point along the candidate path. Thus, at each point along the candidate path, the robot may rotate, reach one or more arms, or change shape, which may change the overall region of swept movement for the particular robot along the candidate path.

The swept movement for the multiple robots may include predicted movement for each robot of the multiple robots over a time period. The swept region of movement for each of the robots, besides the robot that is in focus, can be predicted based on the shape of the robot and the candidate path of the robot. Although the robot may not actually move in all spaces of the region of movement, by generating a region of predicted movement, the server system can generate an updated path that avoids any collisions with predicted paths of the other robots. This step is performed for each of the multiple robots except for the robot in focus.

During 506, at least some of the swept regions for the multiple robots are aggregated to determine amounts of overlap among the swept regions at different locations. In some implementations, one robot will have its candidate path adjusted. The server system will aggregate the swept movement regions for each of the other robots to determine their overlapping and non-overlapping regions. The server system can determine for each of the swept regions a number of overlapping and non-overlapping regions for the other robots. The server system can aggregate at least some of the swept regions that overlap other swept regions at the different locations. Not all swept regions have overlapping regions and those regions will not need to be aggregated. Additionally, the robot that is having its candidate path adjusted does not factor in to the aggregation of swept movement volumes.

In some implementations, the server system associates costs with each of the aggregated overlapping regions for the other robots. For example, the costs assigned to each of the swept regions can be based on an amount of the overlapping regions. A higher score is associated with regions of greater degrees of overlap among swept volumes. Similarly, a lower score is associated with regions of lower degrees of overlap among swept volumes. Thus, the regions and corresponding costs can be shown as a "heat-map." Typically, the regions associated with the highest costs are denoted as hot spots or hot regions on the heat-map. Likewise, regions associated with lower costs are noted as cold spots or cold regions on the heat-map. For example, the heat-map scores can range from a high score of "5" to a low score of "1." The server system associates costs with each of these regions for the other robots in order to assist with determining an altered path for the robot in focus.

During 508, force vectors directed outward from the swept regions are assigned, and the force vectors have different magnitudes assigned according to the respective amounts of overlap of the swept regions at the different locations. Based on the costs associated with each region of the swept regions for the other robots, the server system generates force vectors based on the costs. For example, the force vectors generated can be repulsive force vectors that are directly proportional to the cost. Thus, the force vectors that have the greatest magnitude stem from regions associated with the highest cost (e.g., overlapping regions with a cost of "5"). The force vectors repel outwards from the region with the highest cost. Additionally, regions that have a lower cost, e.g., regions with a cost of "3" or "1," have force vectors that repel outwards but have a smaller magnitude than the force vectors associated with regions having a cost of "4" or "5."

In some implementations, the force vectors from these regions may repel outwards uniformly from the epicenter of the region. Alternatively, the force vectors from these regions may repel outwards non-uniformly from the epicenter of the region. The non-uniformity may be based on the shape, volume, locations of overlapping with other regions, and other criteria. In other implementations, the force vectors associated with these costs can be attractive forces vectors that are directly proportional to the cost. The higher the cost, the greater the magnitude of the force vectors.

During 510, a path for a particular robot to travel is determined based on the swept regions and the assigned magnitudes of the forces. Using the swept regions and the assigned magnitudes of the forces, the server system, or the robot can generate a path for the corresponding robot. The new path can be generated to avoid the force vectors corresponding to the swept regions of the other robots. The path may move to avoid the strongest magnitude of force vectors. Additionally, a corresponding new swept movement volume can be generated and associated with the new path. For example, as illustrated in system 400, the new path 413 can be associated with a new swept movement volume 422 that describes illustrates a region of movement, as the robot moves along the candidate path, that is indicated by a potential size, shape, movement, reach of the particular robot, and so on. In another example, the new path 413 can be based on an adjusted candidate path that compensates for the swept movement volume 422 and the assigned magnitudes of forces of the objects.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining a candidate path of movement for each of multiple robots;
   determining, for each of the multiple robots, a swept region that the robot would traverse through along its candidate path;
   determining amounts of overlap of the swept regions at different locations;
   defining different spatial regions based on the determined amounts of overlap of the swept regions, wherein at least some of the defined spatial regions are respectively regions of overlap of different quantities of the swept regions;
   assigning, to the spatial regions defined based on the determined amounts of overlap, force vectors directed away from the respective spatial regions, wherein the force vectors for each spatial region have magnitudes assigned based on the quantity of the swept regions that overlap in the spatial region, and wherein (i) first magnitudes for individual swept regions are assigned for force vectors from spatial regions where only one of the swept regions is present and (ii) second magnitudes are assigned for force vectors from spatial regions where multiple swept regions overlap, wherein, for at least a particular spatial region where multiple swept regions overlap, the assigned second magnitude is greater than a sum of the first magnitudes for the respective swept regions that overlap in the particular spatial region; and determining a path for a particular robot to travel based on the determined spatial regions and the assigned force vectors for the spatial regions.

2. The computer-implemented method of claim 1, further comprising determining a different aggregation of the swept regions for each of the multiple robots, wherein the aggregation for each robot is an aggregation of the swept regions of each of the other robots; and
wherein assigning force vectors comprises assigning a different set of force vectors for each of the multiple robots, the set of force vectors for each robot being determined based on the aggregation of the swept regions of each of the other robots.

3. The computer-implemented method of claim 1, wherein determining the path for the particular robot comprises altering the candidate path by according to the set of force vectors.

4. The computer-implemented method of claim 1, further comprising:
updating the candidate paths for each of the multiple robots based on aggregations of the swept regions;
determining updated swept regions for the multiple robots based on the updated candidate paths;
aggregating the updated swept regions and assigning updated force vectors directed outwards from the updated swept regions; and
determining an updated path for the particular robot to travel based on the updated swept regions and the updated force vectors.

5. The computer-implemented method of claim 1, further comprising:
determining a start location and a destination location for the particular robot;
defining a path segment between the start location and the destination location;
determining objects found within proximity to the path segment;
generating force vectors corresponding to the objects based on characteristics of the objects;
wherein determining a path for the particular robot to travel comprises:
altering the path segment based on the force vectors corresponding to the objects and the force vectors directed outward from the swept regions, wherein a degree of alteration of the path segment is dependent on a measure of elasticity set for the path segment, the measure of elasticity defining a degree to which the path segment is stretched in response to the force vectors.

6. The computer-implemented method of claim 1, comprising:
determining a region occupied by a stationary object; and
assigning force vectors directed outward from the region occupied by the stationary object;
wherein the path for the particular robot to travel is further based on the force vectors directed outward from the region occupied by the stationary object.

7. The computer-implemented method of claim 1, wherein determining the path for the particular robot to travel comprises determining, based on the force vectors, an adjustment to a pose or shape of the particular robot to be carried out by the particular robot as the particular robot travels the determined path.

8. The computer-implemented method of claim 1, wherein the force vectors are two-dimensional, and each of the swept regions is a two-dimensional area.

9. The computer-implemented method of claim 1, wherein the force vectors are three-dimensional, and each of the swept regions is a three-dimensional volume.

10. The computer-implemented method of claim 1, wherein determining the path for the particular robot to travel based on the swept regions and the assigned magnitudes of the forces further comprises:
constraining a portion of the path for the particular robot based on characteristics of the particular robot, wherein the characteristics of the particular robot comprise a speed limit of the particular robot, a size of the particular robot, a joint angle limit of the particular robot, or a length of arm reach of the particular robot.

11. The computer-implemented method of claim 1, further comprising:
dividing each of the candidate paths for the multiple robots into multiple path segments, wherein, for each of the candidate paths, each of the multiple path segments corresponds to movement over a different time period in a series of time periods, wherein the series of time periods includes at least a first time period followed by a second time period;
determining adjusted paths for the multiple robots by sequentially evaluating swept volumes of path segments corresponding to a same time period in the series of time periods, comprising:
adjusting the path segments that correspond to the first time period based on swept volumes for the path segments that correspond to the first time period; and
after adjusting the path segments that correspond to the first time period, adjusting the path segments that correspond to the second time period based on swept volumes for the path segments that correspond to the second time period.

12. The computer-implemented method of claim 1, wherein determining a path for a particular robot to travel based on the swept regions and the assigned magnitudes of the forces comprises:
determining an updated path by elastically stretching a particular candidate path for the particular robot, the updated path maintaining a same start location and end location as the particular candidate path while bending in response to the force vectors, the particular candidate path being stretched based on the force vectors to avoid the swept regions for the multiple robots, wherein the amount that the particular candidate path is stretched changes non-linearly so that the amount of change in response to a unit of force decreases the farther the updated path deviates from the particular candidate path.

13. A system comprising:
one or more computers; and
one or more computer-readable media storing instructions that, when executed by the one or more computers, cause the one or more computers to perform operations comprising:
determining a candidate path of movement for each of multiple robots;
determining, for each of the multiple robots, a swept region that the robot would traverse through along its candidate path;
determining amounts of overlap of the swept regions at different locations;
defining different spatial regions based on the determined amounts of overlap of the swept regions, wherein at least some of the defined spatial regions are respectively regions of overlap of different quantities of the swept regions;

assigning, to the spatial regions defined based on the determined amounts of overlap, force vectors directed away from the respective spatial regions, wherein the force vectors for each spatial region have magnitudes assigned based on the quantity of the swept regions that overlap in the spatial region, and wherein (i) first magnitudes for individual swept regions are assigned for force vectors from spatial regions where only one of the swept regions is present and (ii) second magnitudes are assigned for force vectors from spatial regions where multiple swept regions overlap, wherein, for at least a particular spatial region where multiple swept regions overlap, the assigned second magnitude is greater than a sum of the first magnitudes for the respective swept regions that overlap in the particular spatial region; and determining a path for a particular robot to travel based on the determined spatial regions and the assigned force vectors for the spatial regions.

14. The system of claim 13, further comprising:

wherein aggregating the swept regions for the multiple robots comprises determining a different aggregation of the swept regions for each of the multiple robots, wherein the aggregation for each robot is an aggregation of the swept regions of each of the other robots; and wherein assigning force vectors directed outward from the swept regions comprises assigning a different set of force vectors for each of the multiple robots, the set of force vectors for each robot being determined based on the aggregation of the swept regions of each of the other robots.

15. The system of claim 13, further comprising:

updating the candidate paths for each of the multiple robots based on aggregations of the swept regions;

determining updated swept regions for the multiple robots based on the updated candidate paths;

aggregating the updated swept regions and assigning updated force vectors directed outwards from the updated swept regions; and determining an updated path for the particular robot to travel based on the updated swept regions and the updated force vectors.

16. The system of claim 13, further comprising:

determining a start location and a destination location for the particular robot;

defining a path segment between the start location and the destination location;

determining objects found within proximity to the path segment;

generating force vectors corresponding to the objects based on characteristics of the objects;

wherein determining a path for the particular robot to travel comprises:

altering the path segment based on the force vectors corresponding to the objects and the force vectors directed outward from the swept regions, wherein a degree of alteration of the path segment is dependent on a measure of elasticity set for the path segment, the measure of elasticity defining a degree to which the path segment is stretched in response to the force vectors.

17. One or more non-transitory computer-readable media storing instructions that are operable, when executed by one or more computers, to cause the one or more computers to perform operations comprising:

determining a candidate path of movement for each of multiple robots;

determining, for each of the multiple robots, a swept region that the robot would traverse through along its candidate path;

determining amounts of overlap of the swept regions at different locations;

defining different spatial regions based on the determined amounts of overlap of the swept regions, wherein at least some of the defined spatial regions are respectively regions of overlap of different quantities of the swept regions;

assigning, to the spatial regions defined based on the determined amounts of overlap, force vectors directed away from the respective spatial regions, wherein the force vectors for each spatial region have magnitudes assigned based on the quantity of the swept regions that overlap in the spatial region, and wherein (i) first magnitudes for individual swept regions are assigned for force vectors from spatial regions where only one of the swept regions is present and (ii) second magnitudes are assigned for force vectors from spatial regions where multiple swept regions overlap, wherein, for at least a particular spatial region where multiple swept regions overlap, the assigned second magnitude is greater than a sum of the first magnitudes for the respective swept regions that overlap in the particular spatial region; and determining a path for a particular robot to travel based on the determined spatial regions and the assigned force vectors for the spatial regions.

18. The computer-implemented method of claim 1, wherein defining the different spatial regions comprises segmenting the swept regions into contiguous regions, wherein each of the contiguous regions has a quantity of overlapping swept regions that is uniform across the contiguous region.

19. The computer-implemented method of claim 1, wherein assigning the force vectors comprises assigning the force vectors based on the size and shape of the defined spatial regions.

* * * * *